(12) United States Patent
Onomatsu et al.

(10) Patent No.: US 7,702,278 B2
(45) Date of Patent: Apr. 20, 2010

(54) BROADCAST RECEIVER WITH SMART ANTENNA BEAM SCANNING

(75) Inventors: Takehiro Onomatsu, Osaka (JP); Shusuke Narita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 807 days.

(21) Appl. No.: 11/166,050

(22) Filed: Jun. 24, 2005

(65) Prior Publication Data

US 2006/0003692 A1 Jan. 5, 2006

(30) Foreign Application Priority Data

Jun. 25, 2004 (JP) ............................ P2004-188644

(51) Int. Cl.
*H04H 20/71* (2008.01)
(52) U.S. Cl. .................. 455/3.01; 455/191.1; 455/3.04; 455/3.05; 455/3.06; 455/25; 343/751; 343/754; 343/757; 343/758; 725/68; 725/69; 725/59
(58) Field of Classification Search ............. 455/193.1, 455/3.02–3.06, 25, 63.4, 575.7, 151.1, 161.1; 343/751, 754, 757, 758, 776, 777; 725/68–72, 725/59
See application file for complete search history.

(56) References Cited

U.S. PATENT DOCUMENTS

| | | | | |
|---|---|---|---|---|
| 4,334,230 | A * | 6/1982 | Kane ............................ | 343/797 |
| 6,774,863 | B2 * | 8/2004 | Shirosaka et al. ........... | 343/797 |
| 6,885,847 | B1 * | 4/2005 | Lumelsky ................... | 455/41.2 |
| 6,952,587 | B2 * | 10/2005 | Whikehart et al. ........ | 455/456.1 |
| 7,071,891 | B2 * | 7/2006 | Shirosaka et al. ........... | 343/810 |
| 7,277,063 | B2 * | 10/2007 | Shirosaka et al. ........... | 343/850 |
| 2003/0107517 | A1 * | 6/2003 | Ikeda et al. ................. | 342/372 |
| 2007/0044125 | A1 * | 2/2007 | Lee ............................. | 725/72 |

FOREIGN PATENT DOCUMENTS

JP 62-69733 3/1987

(Continued)

OTHER PUBLICATIONS

Taniguchi, Yoshiyuki, Antenna Device, Japanese translation 62-069733, All pgs.*

(Continued)

*Primary Examiner*—Edward Urban
*Assistant Examiner*—Fayyaz Alam
(74) *Attorney, Agent, or Firm*—Osha • Liang LLP

(57) ABSTRACT

A broadcast receiver includes a smart antenna, a tuner which extracts a signal of predetermined channel from among airwaves received by the smart antenna, a signal processing unit which processes the signal extracted by the tuner, and a control unit, in a case the airwave has become unreceivable, to set a pointing direction of the antenna on that occasion as a reference direction, to shift the pointing direction a predetermined magnitude counterclockwise or clockwise, and to decide propriety of reception of the airwave. The control unit iterates counterclockwise and clockwise shifts alternately in a region near the reference direction, while the shift magnitude of the pointing direction is being increased in succession and so that the direction as to which the propriety of reception has been decided once may not be included in the directions of the shifts, until the reception of the airwave becomes possible.

2 Claims, 9 Drawing Sheets

FOREIGN PATENT DOCUMENTS

| | | |
|---|---|---|
| JP | 10-10221 A | 1/1989 |
| JP | 06-013809 A | 1/1994 |
| JP | 7-226611 | 8/1995 |
| JP | 11-298226 | 10/1999 |

OTHER PUBLICATIONS

Patent Abstracts of Japan, Publication No. 11-298226, Publication Date Oct. 29, 1999, 1 page.

Patent Abstracts of Japan, Publication No. 62-069733, Publication Date Mar. 31, 1987, 1 page.

Patent Abstracts of Japan, Publication No. 07-226611, publication Date Aug. 22, 1995, 1 page.

Office Action mailed Apr. 14, 2009, Issued with respect to the Japanese Patent Application No. 2004-188644; 2 pgs.

Patent Abstracts of Japan, Publication No. 06-013809, publication Date Jan. 21, 1994, 1 page.

Patent Abstracts of Japan, Publication No. 10-10221, publication Date Jan. 13, 1989, 1 page.

* cited by examiner

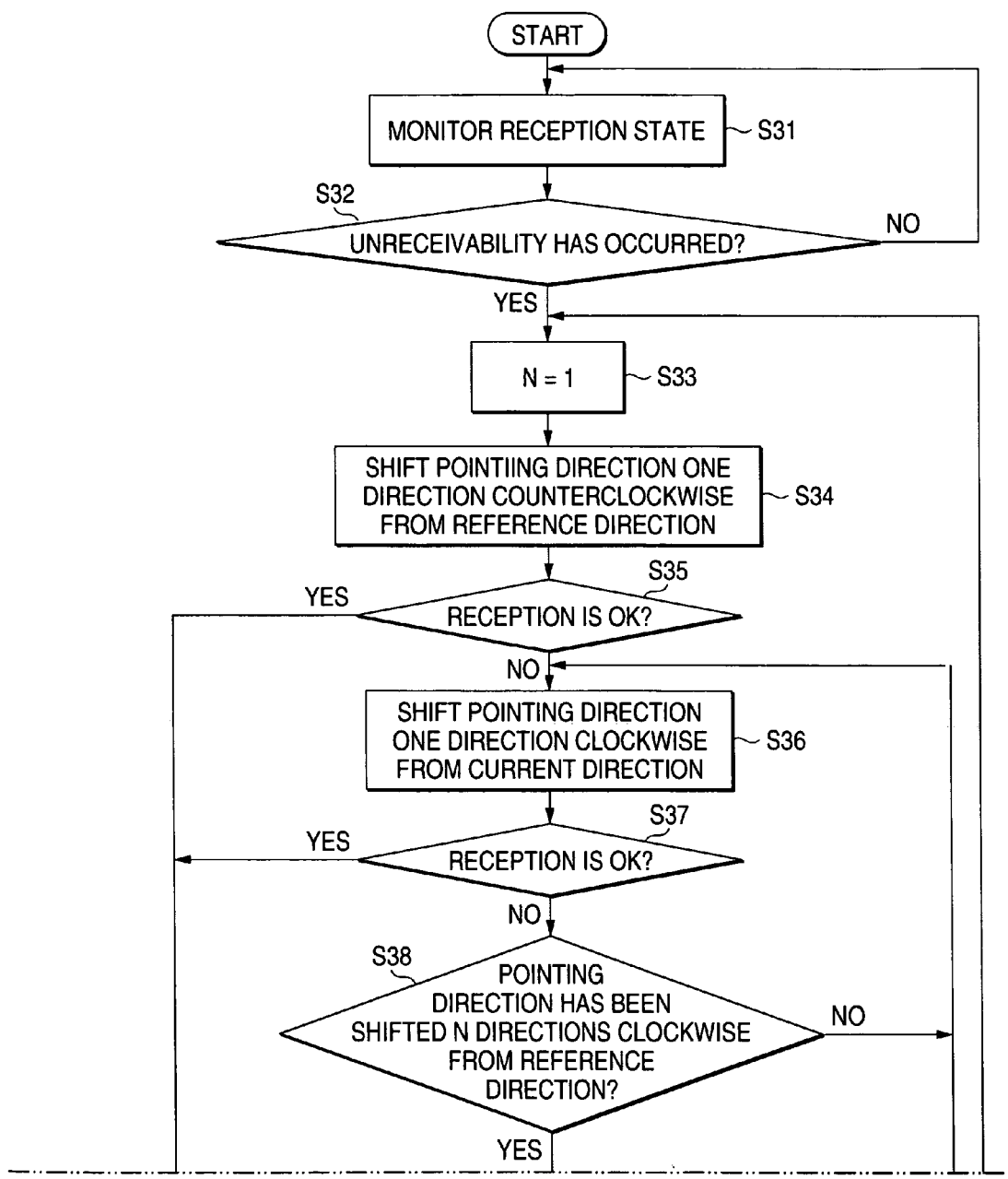

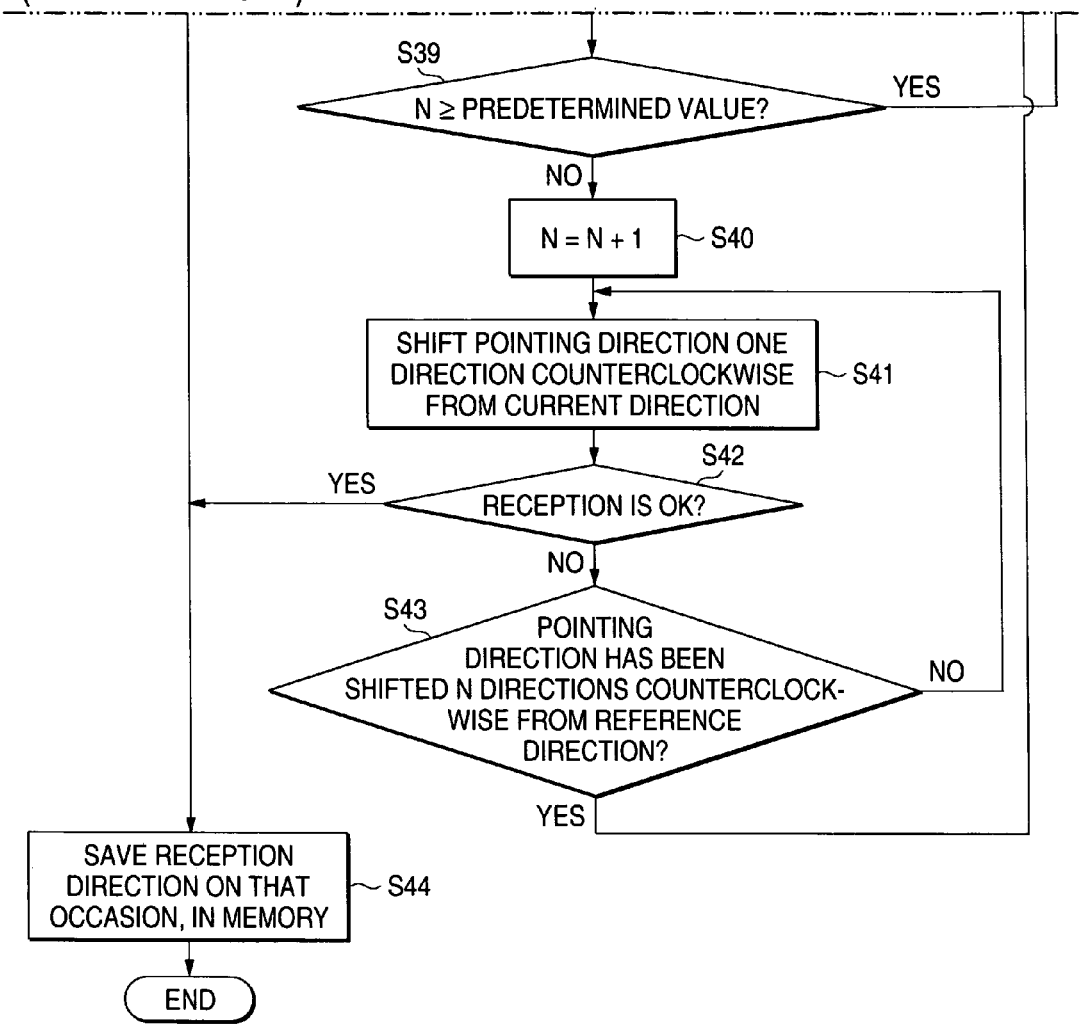

BROADCAST RECEIVER WITH SMART ANTENNA BEAM SCANNING

BACKGROUND OF THE INVENTION

1. Field of the Invention

The present invention relates to a broadcast receiver which receives the airwaves of predetermined channels transmitted from a plurality of broadcast stations, by a directionality switching antenna.

2. Description of the Related Art

In Japan, in general, the airwaves of television broadcasts or the likes are transmitted from a base station in one place. Therefore, substantially all of the airwaves which a plurality of broadcast stations transmit can be received in such a way that an antenna for receiving the broadcasts is fixed to the roof, the veranda or the like of a house so as to look toward the base station, and that the antenna and a broadcast receiver are connected by a cable. In contrast, in, for example, U.S.A., airwaves are individually transmitted from a plurality of broadcast stations, respectively. Therefore, when an antenna is fixed looking toward one place, the airwave of the broadcast station located in a direction in which the antenna looks can be received, but the airwave of the broadcast station located in a direction in which the antenna does not look cannot be received.

Accordingly, the directionality of one antenna must be switched in a plurality of directions in order that the airwaves from the plurality of broadcast stations located in different bearings may be received by the antenna. Such an antenna capable of switching its directionality (hereinbelow, termed "directionality switching antenna") is stated in, for example, JP-A-7-226611 (paragraphs 0019-0025, FIGS. 1 and 3), JP-A-11-298226 (paragraphs 0008-0010, FIG. 5), and JP-A-62-69733 (lines 9-17, left upper column, page 3, and line 16, right lower column, page 3—line 14, right upper column, page 4, FIGS. 1 and 4) mentioned below. The directionality switching antenna includes a plurality of antenna elements, and phase shifters, etc. corresponding to the individual antenna elements. It adjusts the phases of signals received by the respective antenna elements, by the corresponding phase shifters, and then combines the resulting signals, thereby to electrically vary the directionality. Regarding a smart antenna which is one example of the directionality switching antenna, it is stipulated by standards to switch the directionality in 16 directions.

When such a directionality switching antenna is employed, the airwave from each broadcast station can be received in such a way that a control signal is transmitted from a broadcast receiver to the antenna so as to switch the directionality of this antenna to a predetermined direction. Thus, even when a user has fixedly mounted the directionality switching antenna on the roof or the like of a house, he/she can receive almost all airwaves transmitted from a plurality of dotted broadcast stations.

Methods of controlling the directionality switching antenna are disclosed in JP-A-7-226611, JP-A-11-298226, and JP-A-62-69733. In JP-A-7-226611, several appropriate parameters are stored in a storage circuit, whereby a pointing direction can be scanned at will in accordance with a pointing-direction control signal, and a directionality pattern can be simultaneously changed in accordance with the pointing direction by appropriately selecting the parameter. In JP-A-11-298226, each time a reception channel is altered, is the directionality of the antenna is scanned in all bearings, reception power levels on that occasion are measured, and the directionality of the antenna is set at the bearing affording the maximum reception power level, whereby the directionality of the antenna can be optimally set every channel. In JP-A-62-69733, when a reception state has become inferior, the beam direction of a combined pointing characteristic is swung around a beam direction on that occasion, while an angle is being gradually widened alternately counterclockwise and clockwise, and reception is continued in a direction in which the reception state has become favorable.

In a broadcast receiver which receives a airwave by a directionality switching antenna as stated above, when a frequency-locked state has missed, the state of unreceivability appears in which the airwave having been received till then fails to be normally received. In such a case, it is considered that, as shown in FIG. 8 by way of example, the pointing direction of the antenna is successively scanned from direction-0, which is the pointing direction in the case of the unreceivability, to direction-15, so as to detect a receivable direction. Since, however, this method examines the proprieties of reception in all directions, it is inferior in efficiency.

Besides, in JP-A-62-69733, in a case where unreceivability has occurred, a favorable reception state is searched for in such a way that the directionality of the antenna is switched around a pointing direction on that occasion, while an angle is being widened alternately counterclockwise and clockwise. More specifically, the directionality is switched 45° clockwise from an initial position (0°), and in a case where reception is inferior at the resulting position, the directionality is switched 45° counterclockwise from the initial position (0°). In a case where reception is inferior even at the resulting position, the directionality is switched 90° clockwise from the initial position (0°), and in a case where reception is inferior even at the resulting position, the directionality is switched 90° counterclockwise from the initial position (0°). Further, in a case where reception is inferior even at the resulting position, the directionality is switched 135° clockwise from the initial position (0°). In this manner, the directionality is switched up to 180° counterclockwise and clockwise, respectively, while the angle is being gradually widened. It is also stated in this document to randomize the switching direction of the directionality.

However, this document is premised on an antenna device which is disposed in a vehicle or the like mobile object. In such a device, the reception state frequently fluctuates depending upon the moving direction of the mobile object. In the antenna device for such a mobile object, accordingly, it is somewhat significant for quickly finding the receivable direction to switch the directionality in a wide range over the whole circumference or at random as in JP-A-62-69733. In contrast, in case of a broadcast receiver which is disposed indoors, an antenna device to be connected therewith is fixedly mounted on the roof or the like of a house, and hence, the reception state rarely fluctuates as frequently as in the case of the mobile object. Therefore, when the directionality of the antenna is switched by the method as in JP-A-62-69733 upon the occurrence of the unreceivability, a rather longer time is sometimes expended till the detection of the favorable reception direction. Any practicable means for solving such a problem is not indicated in JP-A-7-226611 and JP-A-11-298226, either.

Accordingly, an object of the present invention is to provide a broadcast receiver which can efficiently detect a receivable direction when unreceivability has occurred in a directionality switching antenna.

SUMMARY OF THE INVENTION

According to the present invention, in a broadcast receiver which receives airwaves by a directionality switching antenna capable of switching its directionality in a plurality of directions, in a case where the reception of the airwave by the antenna has become impossible, the pointing is direction of the antenna on that occasion is set as a reference direction, so as to shift the pointing direction a predetermined magnitude counterclockwise or clockwise from the reference direction, and to thereafter decide the propriety of the reception of the airwave in the pertinent direction, and such counterclockwise and clockwise shifts are alternately iterated in regions near the reference direction, with the shift magnitude of the pointing direction increased in succession, until the reception of the airwave becomes possible. Incidentally, "unreceivability" termed in the invention does not signify only a case where a reception signal cannot be detected at all, but it includes a case where, although the reception signal can be detected, its level is less than a certain value.

In the case of the antenna of installation type, the fluctuation of the reception state is not so extraordinary as in the case of the mobile object, as stated before. Therefore, even when the state of unreceivability has appeared, re-reception becomes possible comparatively often in a direction near the pointing direction on that occasion. Accordingly, the receivable direction can be found in a short time at a high probability in such a way that, as in the invention, the pointing direction in the case of unreceivability is set as the reference direction so as to alternately iterate the counterclockwise and clockwise shifts in the region near the reference direction.

In the invention, a smart antenna can be employed as a typical one of directionality switching antennas. In embodiments to be described later, three embodiments employing the smart antenna will be disclosed.

In each of the embodiments, in a broadcast receiver having a tuner which extracts a signal of predetermined channel from among airwaves received by a smart antenna, and a signal processing unit which processes the signal extracted by the tuner, there is disposed control unit operating in a case where the airwave has become unreceivable by the smart antenna, to set a pointing direction of the antenna on that occasion, as a reference direction, to shift the pointing direction a predetermined magnitude counterclockwise or clockwise from the reference direction, and to decide propriety of reception of the airwave in a direction subjected to the shift.

In the first embodiment, the control unit iterates counterclockwise and clockwise shifts alternately in a region near the reference direction, while the shift magnitude of the pointing direction is being increased in succession and so that the direction as to which the propriety of reception has been decided once may not be included in the directions of the shifts, until the reception of the airwave becomes possible. In this manner, the directionality is shifted by excluding the direction as to which the propriety of reception has been decided once, whereby a search time period till the detection of a receivable direction can be shortened.

In the second embodiment, the control unit iterates counterclockwise and clockwise shifts alternately in a region near the reference direction, while the shift magnitude of the pointing direction is being increased in succession and so that the direction as to which the propriety of reception has been decided once may be also included in the directions of the shifts, until the reception of the airwave becomes possible. In this manner, the directionality is shifted without excluding the direction as to which the propriety of reception has been decided once, whereby a somewhat longer time than the first embodiment is required, but a plurality of times of decisions are rendered as to each identical direction, so that a detection precision for a receivable direction can be enhanced.

In the third embodiment, the control unit shifts the pointing direction over a plurality of cycles in a region near the reference direction until the reception of the airwave becomes possible, it performs counterclockwise and clockwise shifts alternately from the reference direction in each of the cycles so that the direction as to which the propriety of reception has been decided once within the pertinent cycle may not be included in the directions of the shifts, and it increases the shift magnitude of the pointing direction each time one cycle has ended to shift to the next cycle. In this way, multiple decisions are not rendered as to an identical direction within each cycle, and multiple decisions are rendered as to each identical direction among the individual cycles, so that, as a search time period till the detection of a receivable direction is shortened to some extent, a detection precision for the receivable direction can be enhanced to some extent.

According to the present invention, when unreceivability by a directionality switching antenna has occurred, a receivable direction can be efficiently detected, and hence, it is permitted to promptly resume a normal reception state.

BRIEF DESCRIPTION OF THE DRAWINGS

FIG. 5 is a flow chart expressing the operation of the second embodiment;

DETAILED DESCRIPTION OF THE INVENTION

Figure 1:
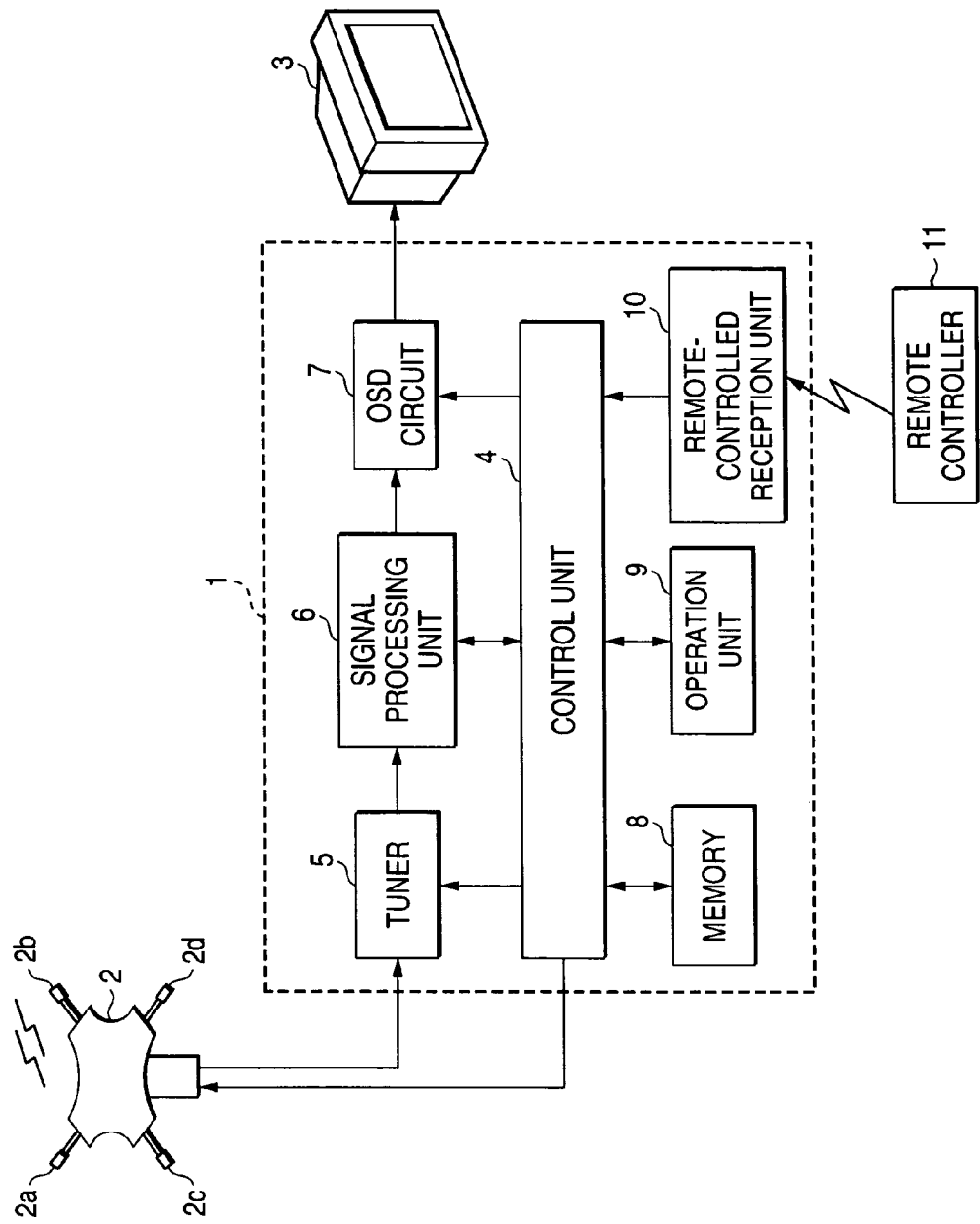
FIG. 1 is a diagram showing a reception system which employs a broadcast receiver according to the present invention.

FIG. 1 is a diagram showing a reception system for a television broadcast as employs a broadcast receiver according to the present invention. Referring to FIG. 1, numeral 1 designates the broadcast receiver, numeral 2 a smart antenna, and numeral 3 a television receiving set (hereinbelow, abbreviated to "TV set"). The broadcast receiver 1 and the TV set 3 are installed in the house of a general home, and are interconnected by a cable. The smart antenna 2 is mounted on and fixed to the roof or veranda of the house, and is connected with the broadcast receiver 1 by a cable.

The smart antenna 2 includes four antenna elements 2a-2d, phase shifters disposed in correspondence with the respective antenna elements 2a-2d, a combiner, and a control circuit (the others than the antenna elements 2a-2d are not shown). The phases of signals received by the respective antenna elements 2a-2d are adjusted by the corresponding phase shifters, and the signals subjected to the adjustments are combined by the combiner, whereby directionalities are electrically switched in 16 directions. Incidentally, the "16 directions" are the individual directions which are obtained by dividing 360° around the smart antenna 2, by 16, and they are respectively indicated by Nos. 0-15 (refer to, for example, FIG. 2). The broadcast receiver 1 controls the smart antenna 2 and switches the directionalities of this smart antenna 2, thereby to receive any of television airwaves which are transmitted from a plurality of broadcast stations dotted around the house. The smart antenna 2 constructs one embodiment of a directionality switching antenna in the invention.

Numeral 4 designates a control unit which includes a CPU, a ROM, a RAM, etc., and which controls the individual parts of the broadcast receiver 1. Programs and data for controls are stored in the ROM of the control unit 4, and data for controls are stored in the RAM in readable and writable fashion. As will be explained later, the control unit 4 switches the directionalities of the smart antenna 2 and detects any receivable direction when unreceivability has occurred. The control unit 4 constructs one embodiment of control unit in the invention.

Numeral 5 designates a tuner, which derives the signal of a predetermined channel from among the airwaves received by the smart antenna 2. Numeral 6 designates a signal processing unit, which processes the signal derived by the tuner 5, so as to generate a reproduced video signal and a reproduced audio signal. Numeral 7 designates an OSD (on-Screen Display) circuit, by which picture data outputted from the control unit 4 are superposed on the reproduced video signal outputted from the signal processing unit 6, so as to present an on-screen display on the screen of the monitor of the TV set 3. The TV set 3 displays an image on the monitor on the basis of the reproduced video signal outputted from the signal processing unit 6, and it emits a speech from a loudspeaker on the basis of the reproduced audio signal outputted from the signal processing unit 6 (in FIG. 1, an audio system is omitted from illustration).

Numeral 8 designates a nonvolatile memory, numeral 9 an operation unit which includes various keys such as channel keys and a power source key, and numeral 10 a remote-controlled reception unit which receives signals from a remote controller 11. The remote controller 11 includes various keys such as channel keys, menu keys and ten-keys.

In the above configuration, when a user turns ON the power source of the broadcast receiver 1 after having connected this broadcast receiver 1 and the smart antenna 2, the control unit 4 presets (initially sets) channels. Incidentally, also when the user has manipulated the remote controller 11 so as to give the instruction of the presetting, the control unit 4 presets channels. In the channel presetting, each channel No. and the No. of the direction in which the particular channel is receivable are successively recorded in the memory 8. Besides, when all the channels have been preset, a channel presetting table in which the channel Nos. and the direction Nos. are associated is created in the predetermined area of the memory 8.

The creation of the channel presetting table signifies that almost all of the airwaves transmitted from the plurality of broadcast stations dotted around the house have been received, and that the receivable antenna directions have been set in the broadcast receiver 1 for the respective channel Nos. Therefore, when the user has specified any channel by manipulating the remote controller 11 after the creation of the table, the control unit 4 reads out of the table the direction in which the airwave of the specified channel can be received, and it switches the directionality of the smart antenna 2 to the direction which is indicated by the corresponding No., whereby the airwave of the particular channel No. can be immediately received. Besides, the received airwave is processed by the tuner 5 and the signal processing unit 6, whereby the image can be immediately displayed on the TV set 3, together with the emission of the speech. Thus, it is permitted to shorten a time period which is required until the user is allowed to view the broadcast of the specified channel No.

Figure 2:
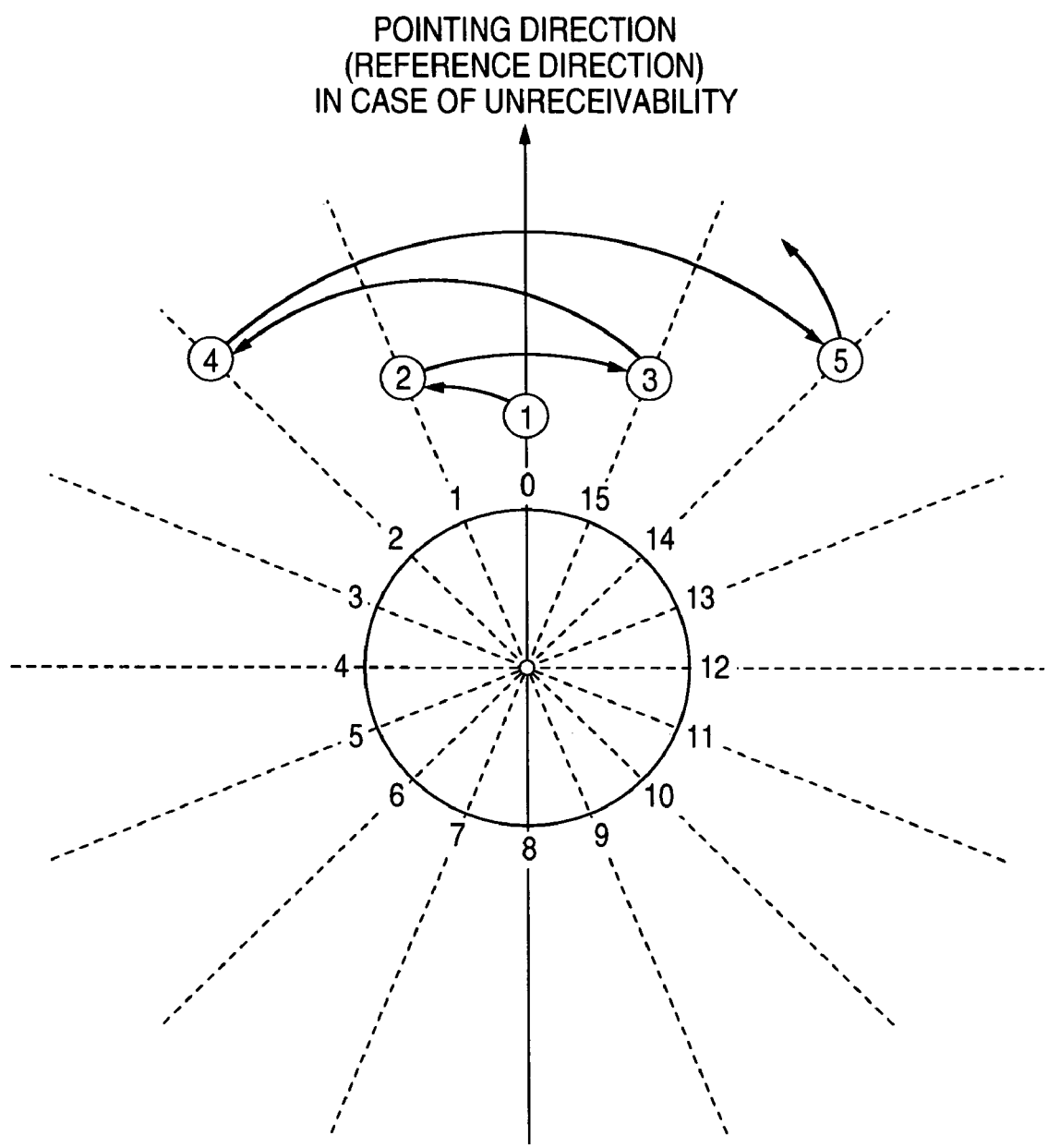
FIG. 2 is a diagram for explaining the operation of a first embodiment.

Next, there will be described an operation in the case where unreceivability has occurred in the above broadcast receiver 1. FIG. 2 is a diagram for explaining the operation in the case of the unreceivability in the first embodiment of the invention. Referring to FIG. 2, numerals 0-15 along the outer periphery of a circle indicate the directions of the antenna. Besides, numerals within circles denote the sequence of the shifts of pointing directions. The same holds true also of FIG. 4 and FIG. 6.

It is now assumed that the pointing direction of the antenna at the occurrence of the unreceivability be the direction-0. The direction-0 is set as a reference direction, the pointing direction is first shifted one direction counterclockwise, and the level of a reception signal in the direction-1 is detected. Herein, receivability is decided on condition that the level is, at least, a predetermined threshold value, and the unreceivability is decided on condition that the level is less than the threshold value. The deciding method holds true also in the ensuing description. In a case where the unreceivability has been decided also in the direction-1, the pointing direction is subsequently shifted one direction clockwise from the reference direction (direction-0), and the level of a reception signal in the direction-15 is detected. In a case where the unreceivability has been decided also in the direction-15, the pointing direction is shifted two directions counterclockwise from the reference direction (direction-0), and the level of a reception signal in the direction-2 is detected. In a case where the unreceivability has been decided also in the direction-2, the pointing direction is shifted two directions clockwise from the reference direction (direction-0), and the level of a reception signal in the direction-14 is detected.

While the alternate scans are being performed counterclockwise and clockwise in this way, the pointing direction is sequentially shifted, and the propriety of the reception of the airwave in each direction is decided. Besides, in a case where the receivable direction has been found in due course, the scan operation is stopped at the point of time, and the found direction is set as a new pointing direction. Thenceforth, the airwave is received with the pointing direction of the antenna fixed to the found direction.

Meanwhile, the leftward or rightward shift range of the pointing direction is not limitless, but it is limited to a predetermined region near the reference direction. By way of example, the shift range is set at a range of the direction-0-direction-2 on the left side of the reference direction (direction-0), and at a range of the direction-0-direction-14 on the right side of the reference direction (direction-0). However, this is a mere example, and it is also possible to set, for example, a range of the direction-0-direction-3 on the left side of the reference direction and a range of the direction-0-direction-13 on the right side of the reference direction. Essentially, the shift range may be limited within a certain angular range from the reference direction.

In a case where the receivable direction has not been detected in the angular range, the scan operation is returned to the first stage and is restarted with shifting the pointing direction one direction counterclockwise, with the direction-0 as the reference direction. This operation is iterated until the reception of the airwave becomes possible. The reference direction is the direction in which the airwave could be normally received before the occurrence of the unreceivability, and the airwave can be received again at a high probability in the direction near the reference direction. It is therefore permitted to find the receivable direction in a short time, by shifting the pointing direction with the range limited as stated above.

As seen from FIG. 2, in the first embodiment, the directionality is shifted by excluding the direction as to which the propriety of the reception was decided once. More specifically, the direction-0 as to which the propriety of the reception was decided is skipped in the case of shifting the directionality from the direction-1 to the direction-15, the directions-0 and -1 as to which the proprieties of the reception were decided are skipped in the case of shifting the directionality from the direction-15 to the direction-2, and the directions-1, -0 and -15 as to which the proprieties of the reception were decided are skipped in the case of shifting the directionality from the direction-2 to the direction-14. In this way, repeated decisions on the same directions are eliminated, and a search time period till the detection of the receivable direction can be shortened.

Figure 3:
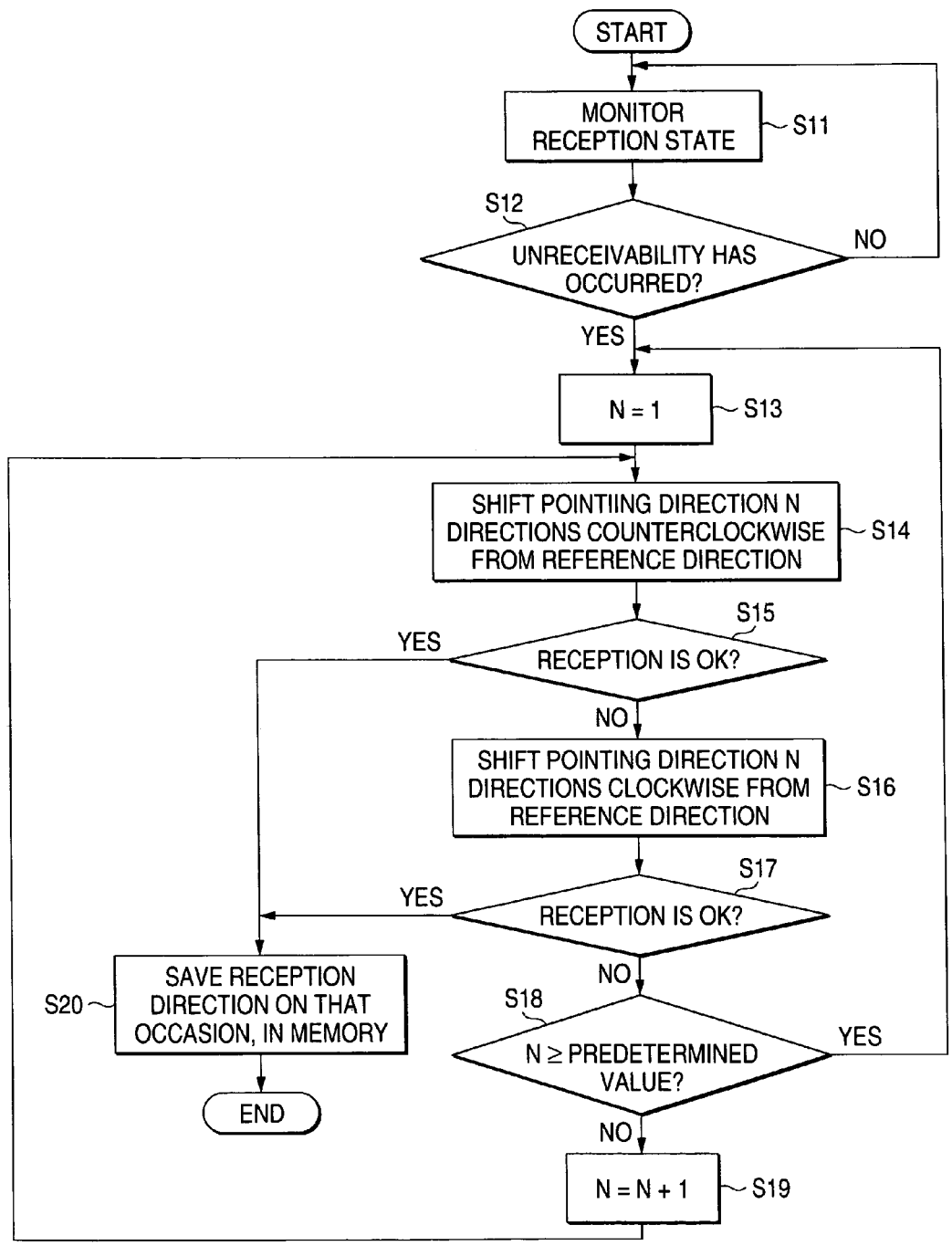
FIG. 3 is a flow chart expressing the operation of the first embodiment.

FIG. 3 is a flow chart expressing an operation in the case of unreceivability in the first embodiment described above. The procedure of the operation is executed by the CPU of the control unit 4 in accordance with a program stored in the ROM. The same holds true also of the flow charts of FIG. 5 and FIG. 7.

The control unit 4 is always monitoring the reception state of the smart antenna 2 (step S11). If the level of a reception signal at the smart antenna 2 is, at least, a threshold value, an unreceivable state has not appeared (step S12: NO), and the control unit 4 returns to the step S11 so as to continue the monitoring of the reception state. When the level of the reception signal at the smart antenna 2 has become less than the threshold value, the control unit 4 decides the appearance of the unreceivable state (step S12: YES) and sets the value of a counter N at N=1 (step S13). The counter is provided in, for example, the predetermined area of the memory (RAM) of the control unit 4. Besides, the pointing direction of the antenna at the occurrence of the unreceivability is set as a reference direction, and this pointing direction is shifted N directions counterclockwise (step S14). Since N=1 holds at the current time, the pointing direction is shifted one direction counterclockwise. The pointing direction on this occasion becomes the direction-1 in FIG. 2.

Subsequently, the control unit 4 detects the level of a reception signal in the pointing direction (direction-1) subjected to the shift, so as to decide the propriety of reception (step S15). In a case where the reception is possible in the pertinent direction (step S15: YES), the reception direction (direction No.) on that occasion is saved in the memory 8 (step S20). On the other hand, in a case where the reception is impossible (step S15: NO), the pointing direction is shifted N directions clockwise from the reference direction (direction-0) (step S16). Since N=1 holds at the current time, the pointing direction is shifted one direction clockwise. The pointing direction on this occasion becomes the direction-15 in FIG. 2.

Subsequently, the control unit 4 detects the level of a reception signal in the pointing direction (direction-15) subjected to the shift, so as to decide the propriety of reception (step S17). In a case where the reception is possible in the pertinent direction (step S17: YES), the reception direction (direction No.) on that occasion is saved in the memory 8 (step S20). On the other hand, in a case where the reception is impossible (step S17: NO), whether or not the value of the counter N has reached a predetermined value is decided (step S18). The predetermined value serves to limit the shift range of the pointing direction, in other words, the search range of a receivable direction, within a certain range, and it is set at, for example, "3". In the case where the predetermined value is "3", the shift range of the pointing direction becomes a region of the direction-0-direction-3 on the left side of the reference direction and a region of the direction-0-direction-13 on the right side of the reference direction, as understood from later description. Since N=1 holds at the current time, N<3 holds (step S18: NO), and N=N+1 is set by adding "1" to the value of the counter N (step S19). Thus, the value of the counter N becomes "2".

Thereafter, the control unit 4 returns to the step S14 so as to shift the pointing direction N directions counterclockwise from the reference direction (direction-0) Since N=2 holds at the current time, the pointing direction is shifted two directions counterclockwise. The pointing direction on this occasion becomes the direction-2 in FIG. 2. Besides, the control unit 4 detects the level of a reception signal in the pointing direction (direction-2) subjected to the shift, so as to decide the propriety of reception (step S15). In a case where the reception is possible in the pertinent direction (step S15: YES), the reception direction (direction No.) on that occasion is saved in the memory 8 (step S20). On the other hand, in a case where the reception is impossible (step S15: NO), the pointing direction is shifted N directions clockwise from the reference direction (direction-0) (step S16). Since N=2 holds at the current time, the pointing direction is shifted two directions clockwise. The pointing direction on this occasion becomes the direction-14 in FIG. 2.

Subsequently, the control unit 4 detects the level of a reception signal in the pointing direction (direction-14) subjected to the shift, so as to decide the propriety of reception (step S17). In a case where the reception is possible in the pertinent direction (step S17: YES), the reception direction (direction No.) on that occasion is saved in the memory 8 (step S20). On the other hand, in a case where the reception is impossible (step S17: NO), whether or not the value of the counter N has reached the predetermined value is decided (step 518). Since N=2 holds at the current time, N<3 holds (step S18: NO), and N=N+1 is set by adding "1" to the value of the counter N (step S19). Thus, the value of the counter N becomes "3".

Thereafter, the control unit 4 returns to the step S14 so as to shift the pointing direction N directions counterclockwise from the reference direction (direction-0). Since N=3 holds at the current time, the pointing direction is shifted three directions counterclockwise. The pointing direction on this occasion becomes the direction-3 in FIG. 2. Besides, the control unit 4 detects the level of a reception signal in the pointing direction (direction-3) subjected to the shift, so as to decide the propriety of reception (step S15). In a case where the reception is possible in the pertinent direction (step S15: YES), the reception direction (direction No.) on that occasion is saved in the memory 8 (step S20). On the other hand, in a case where the reception is impossible (step S15: NO), the pointing direction is shifted N directions clockwise from the reference direction (direction-0) (step S16). Since N=3 holds at the current time, the pointing direction is shifted three directions clockwise. The pointing direction on this occasion becomes the direction-13 in FIG. 2.

Subsequently, the control unit 4 detects the level of a reception signal in the pointing direction (direction-13) subjected to the shift, so as to decide the propriety of reception (step S17). In a case where the reception is possible in the pertinent direction (step S17: YES), the reception direction (direction No.) on that occasion is saved in the memory 8 (step S20). On the other hand, in a case where the reception is impossible (step S17: NO), whether or not the value of the counter N has reached the predetermined value is decided (step S18). Since N=3 holds at the current time, N≧3 holds (step S18: YES), and the control unit 4 shifts to the step S13, at which the value of the counter N is restored to N=1 so as to iterate the series of processing steps described above.

When the receivability has been decided at the step S15 or S17, and the reception direction has been sated in the memory 8 at the step S20, the pointing direction stored in the memory 8 is updated, and the smart antenna 2 sets the directionality at the pertinent new direction on the basis of a command from the control unit 4, so as to receive the airwave henceforth.

Figure 4:
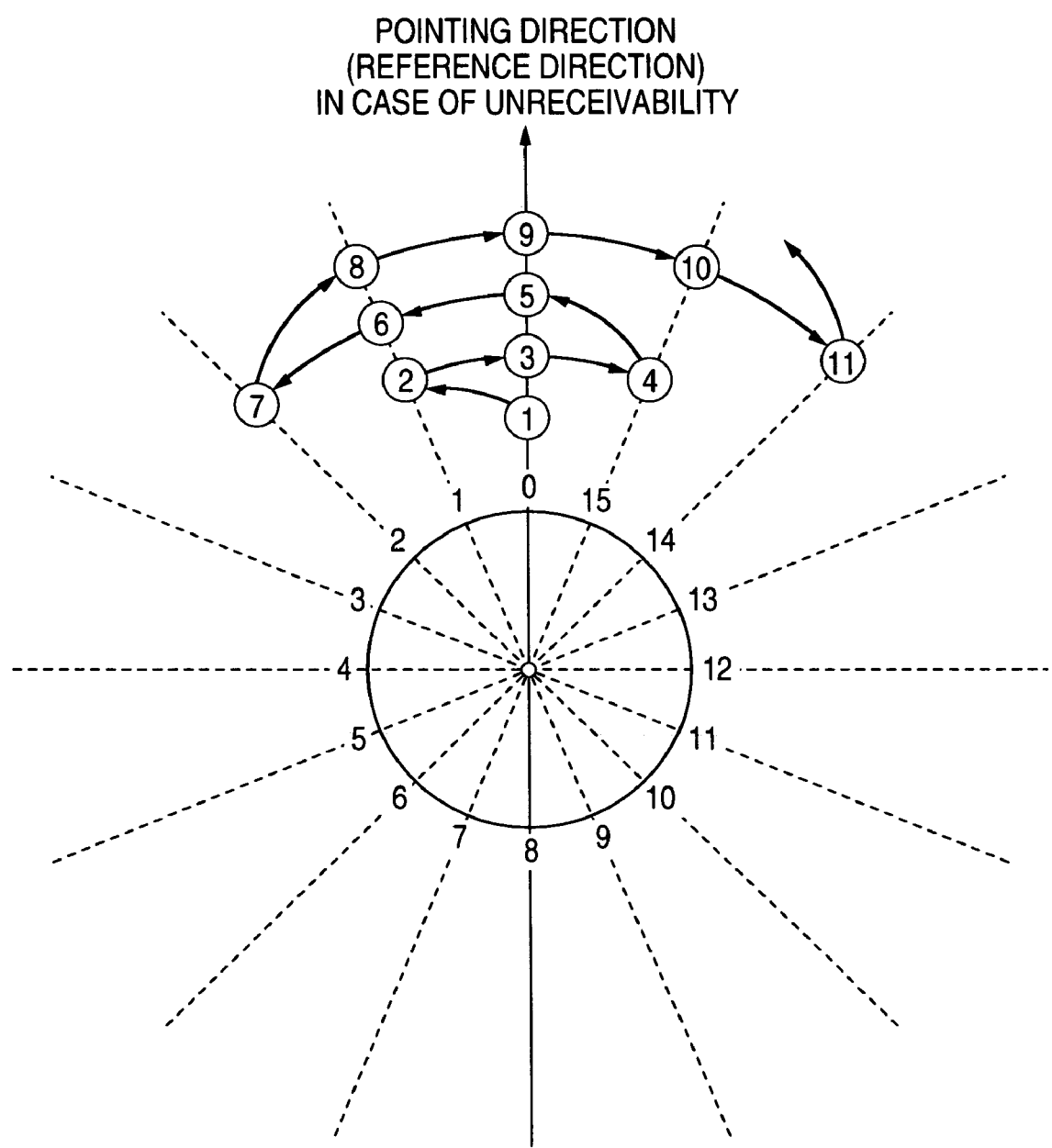
FIG. 4 is a diagram for explaining the operation of a second embodiment.

FIG. 4 is a diagram for explaining an operation in the case of unreceivability in the second embodiment of the invention. It is assumed that the pointing direction of the antenna at the occurrence of the unreceivability be is direction-0. The direction-0 is set as a reference directions the pointing direction is first shifted one direction counterclockwise, and the propriety of reception is decided on the basis of a reception level in direction-1. In a case where the unreceivability has been decided also in the direction-1, the shift direction is inverted, the pointing direction is shifted one direction clockwise from the direction-1, and the propriety of reception in the direction-0 is decided. In a case where the unreceivability has been decided in the direction-0, the pointing direction is shifted one direction clockwise from the direction-0, and the propriety of reception in direction-15 is decided.

In a case where the unreceivability has been decided in the direction-15, the shift direction is inverted, the pointing direction is shifted one direction counterclockwise from the direction-15, and the propriety of reception in the direction-0 is decided again. In a case where the unreceivability has been decided in the direction-0, the pointing direction is shifted one direction counterclockwise from the direction-0, and the propriety of reception in the direction-1 is decided again. In a case where the unreceivability has been decided in the direction-1, the pointing direction is further shifted one direction counterclockwise from the direction-1, and the propriety of reception in direction-2 is decided.

In a case where the unreceivability has been decided in the direction-2, the shift direction is inverted, the pointing direction is shifted one direction clockwise from the direction-2, and the propriety of reception in the direction-1 is decided again. In a case where the unreceivability has been decided in the direction-1, the pointing direction is shifted one direction clockwise from the direction-1, and the propriety of reception in the direction-0 is decided again. In a case where the unreceivability has been decided in the direction-0, the pointing direction is shifted one direction clockwise from the direction-0, and the propriety of reception in direction-15 is decided again. In a case where the unreceivability has been decided in the direction-15, the pointing direction is shifted one direction clockwise from the direction-15, and the propriety of reception in direction-14 is decided.

While the scans are being iterated counterclockwise and clockwise in this way, the pointing direction is sequentially shifted, and the propriety of the reception of the airwave in each direction is decided. Besides, in a case where the receivable direction has been found in due course, the scan operation is stopped at the point of time, and the found direction is set as a new pointing direction. Thenceforth, the airwave is received with the pointing direction of the antenna fixed to the found direction.

Also in the second embodiment, as in the first embodiment, the shift range of the pointing direction is set at a predetermined region near the reference direction. By way of example, the shift range is set at a range of the direction-0-direction-2 on the left side of the reference direction (direction-0), and at a range of the direction-0-direction-14 on the right side of the reference direction (direction-0). However, this is a mere example, and it is also possible to set, for example, a range of the direction-0-direction-3 on the left side of the reference direction and a range of the direction-0-direction-13 on the right side of the reference direction. Essentially, the shift range may be limited within a certain angular range from the reference direction.

In a case where the receivable direction has not been detected in the angular range, the scan operation is returned to the first stage and is restarted with shifting the pointing direction one direction counterclockwise, with the direction-0 as the reference direction. This operation is iterated until the reception of the airwave becomes possible. The reference direction is the direction in which the airwave could be normally received before the occurrence of the unreceivability, and the airwave can be received again at a high probability in the direction near the reference direction. It is therefore permitted to find the receivable direction in a short time, by shifting the pointing direction with the range limited as stated above.

As seen from FIG. 4, in the second embodiment, the directionality is shifted without excluding each direction as to which the propriety of the reception was decided once. More specifically, in a case where the directionality is to be shifted from the direction-1 to the direction-15, it is shifted again to the direction-0 as to which the propriety of reception was decided, and in which the propriety of reception is re-decided; in a case where the directionality is to be shifted from the direction-15 to the direction-2, it is shifted again to the directions-0 and -1 as to which the proprieties of reception were decided, and in which the proprieties of reception are re-decided; and in a case where the directionality is to be shifted from the direction-2 to the direction-14, it is shifted again to the directions-1, -0 and -15 as to which the proprieties of reception were decided, and in which the proprieties of reception are re-decided. In this way, although a time period being somewhat longer than in the first embodiment is required, a plurality of times of decisions are rendered for the identical direction, and hence, a detection precision for the receivable direction can be enhanced.

FIG. 5 is a flow chart expressing an operation in the is case of unreceivability in the second embodiment described above. The control unit 4 is always monitoring the reception state of the smart antenna 2 (step S31). If the level of a reception signal at the smart antenna 2 is, at least, a threshold value, an unreceivable state has not appeared (step S32: NO), and the control unit 4 returns to the step S31 so as to continue the monitoring of the reception state. When the level of the reception signal at the smart antenna 2 has become less than the threshold value, the control unit 4 decides the appearance of the unreceivable state (step S32: YES) and sets the value of a counter N at N=1 (step S33). Besides, the pointing direction of the antenna at the occurrence of the unreceivability is set as a reference direction, and this pointing direction is shifted one direction counterclockwise (step S34). The pointing direction on this occasion becomes the direction-1 in FIG. 4.

Subsequently, the control unit 4 detects the level of a reception signal in the pointing direction (direction-1) subjected to the shift, so as to decide the propriety of reception (step S35). In a case where the reception is possible in the pertinent direction (step S35: YES), the reception direction (direction No.) on that occasion is saved in the memory 8 (step S44). On the other hand, in a case where the reception is impossible (step S35: NO), the pointing direction is shifted one direction clockwise from the current direction (direction-1) (step S36). The pointing direction on this occasion becomes the direction-0 in FIG. 4.

Subsequently, the control unit 4 detects the level of a reception signal in the pointing direction (directions) subjected to the shift, so as to decide the propriety of reception (step S37). In a case where the reception is possible in the pertinent direction (step S37: YES), the reception direction (direction No.) on that occasion is saved in the memory 8 (step S44). On the other hand, in a case where the reception is impossible (step S37: NO), the control unit 4 decides whether or not the pointing direction has been shifted N directions clockwise from the reference direction (direction-0) (step S38). At the current time, N=1 holds, and the pointing direction is the direction-0. Therefore, the control unit 4 judges that the pointing direction has not been shifted one direction clockwise from the reference direction (direction-0) (step S38: NO), and it returns to the step S36 so as to further shift the pointing direction one direction clockwise from the current direction (direction-0). The pointing direction on this occasion becomes the direction-15 in FIG. 4.

Thereafter, the control unit 4 executes the step S37, and it shifts to the step S44 on condition that the reception is possible (step S37: YES), whereas it shifts to the step S38 on condition that the reception is impossible (step S37: NO). At the step S38, the control unit 4 decides again whether or not the pointing direction has been shifted N directions clockwise from the reference direction (direction-0). At this point of time, N=1 holds, and the pointing direction is the direction-15. Therefore, the control unit 4 judges that the pointing direction has been shifted one direction clockwise from the reference direction (step S38: YES).

Subsequently, the control unit 4 decides whether or not the value of the counter N has reached a predetermined value (step S39). As in the case of the first embodiment, the predetermined value serves to limit the shift range of the pointing direction, in other words, the search range of a receivable direction, within a certain range, and it is set at, for example, "3". In the case where the predetermined value is "3", the shift range of the pointing direction becomes a region of the direction-0-direction-3 on the left side of the reference direction and a region of the direction-0-direction-13 on the right side of the reference direction, as understood from later description. Since N=1 holds at the current time, N<3 holds (step S39: NO), and N=N+1 is set by adding "1" to the value of the counter N (step S40). Thus, the value of the counter N becomes "2".

Subsequently, the shift direction is inverted, and the pointing direction is shifted one direction counterclockwise from the current direction (direction-15) (step S41). The pointing direction on this occasion becomes the direction-0 in FIG. 4. Subsequently, the control unit 4 detects the level of a reception signal in the pointing direction (direction-0) subjected to the shift, so as to decide the propriety of reception (step S42). In a case where the reception is possible in the pertinent direction (step S42: YES), the reception direction (direction No.) on that occasion is saved in the memory 8 (step S44). On the other hand, in a case where the reception is impossible (step S42: NO), the control unit 4 decides whether or not the pointing direction has been shifted N directions counterclockwise from the reference direction (direction-0) (step S43). At this point of time, N=2 holds, but the pointing direction is the direction-0. Therefore, the control unit 4 judges that the pointing direction has not been shifted two directions counterclockwise from the reference direction (direction-0) (step S43: NO), and it returns to the step S41 so as to further shift the pointing direction one direction counterclockwise from the current direction (direction-0). The pointing direction on this occasion becomes the direction-1 in FIG. 4.

Thereafter, the control unit 4 executes the step S42, and it shifts to the step S44 on condition that the reception is possible (step S42: YES), whereas it shifts to the step S43 on condition that the reception is impossible (step S42: NO). At the step S43, the control unit 4 decides again whether or not the pointing direction has been shifted two directions counterclockwise from the reference direction (direction-0). At this point of time, the pointing direction is the direction-1 yet. Therefore, the control unit 4 judges that the pointing direction has not been shifted two directions counterclockwise from the reference direction (step S43: NO). Accordingly, the control unit 4 returns to the step S41 again, and it further shifts the pointing direction one direction counterclockwise from the current direction (direction-1). The pointing direction on this occasion becomes the direction-2 in FIG. 4.

Subsequently, the control unit 4 executes the step S42, and it shifts to the step S44 on condition that the reception is possible (step S42: YES), whereas it shifts to the step S43 on condition that the reception is impossible (step S42: NO). At the step S43, the control unit 4 decides again whether or not the pointing direction has been shifted two directions counterclockwise from the reference direction (direction-0). Since the pointing direction is the direction-2 at this point of time, the control unit 4 judges that the pointing direction has been shifted two directions counterclockwise from the reference direction (step S43: YES).

Thereafter, the control unit 4 returns to the step S36, and it inverts the shift direction and shifts the pointing direction one direction clockwise from the current direction (direction-2). The pointing direction on this occasion becomes the direction-1 in FIG. 4. Thenceforth, the steps S36-S38 are similarly iterated and executed, and the pointing direction is shifted one direction clockwise on each occasion. Besides, when the control unit 4 has shifted the pointing direction to the direction-14, it decides that the pointing direction has been shifted two directions clockwise from the reference direction (direction-0) (step S38: YES). Subsequently, the control unit 4 decides whether or not the value of the counter N has reached the predetermined value (step S39). Since N=2 holds at the current time, N<3 holds (step S39: NO), and N=N+1 is set by adding "1" to the value of the counter N (step S40). Thus, the value of the counter N becomes "3".

Subsequently, the control unit 4 inverts the shift direction and shifts the pointing direction one direction counterclockwise from the current direction (direction-14) (step S41). Thenceforth, the steps S41-S43 are similarly iterated and executed, and the pointing direction is shifted one direction counterclockwise on each occasion. When the control unit 4 has shifted the pointing direction to the direction-3, it decides that the pointing direction has been shifted three directions counterclockwise from the reference direction (direction-0) (step S43: YES). Besides, the control unit 4 shifts to the step S36, and it inverts the shift direction and shifts the pointing direction one direction clockwise from the current direction (direction-3). Thenceforth, the steps S36-S38 are similarly iterated and executed, and the pointing direction is shifted one direction clockwise on each occasion. When the control unit 4 has shifted the pointing direction to the direction-13, it decides that the pointing direction has been shifted three directions clockwise from the reference direction (direction-0) (step S38: YES). Subsequently, the control unit 4 decides whether or not the value of the counter N has reached the predetermined value (step S39). Since N=3 holds at this point of time, N$\geq$3 holds (step S39: YES). Accordingly, the control unit 4 shifts to the step S33, at which the value of the counter N is restored to N=1 so as to iterate the series of processing steps described above.

When the receivability has been decided at the step S35, S37 or S42, and the reception direction has been saved in the memory 8 at the step S44, the pointing direction stored in the memory 8 is updated, and the smart antenna 2 sets the directionality at the pertinent new direction on the basis of a command from the control unit 4, so as to receive the airwave henceforth.

Figure 6:
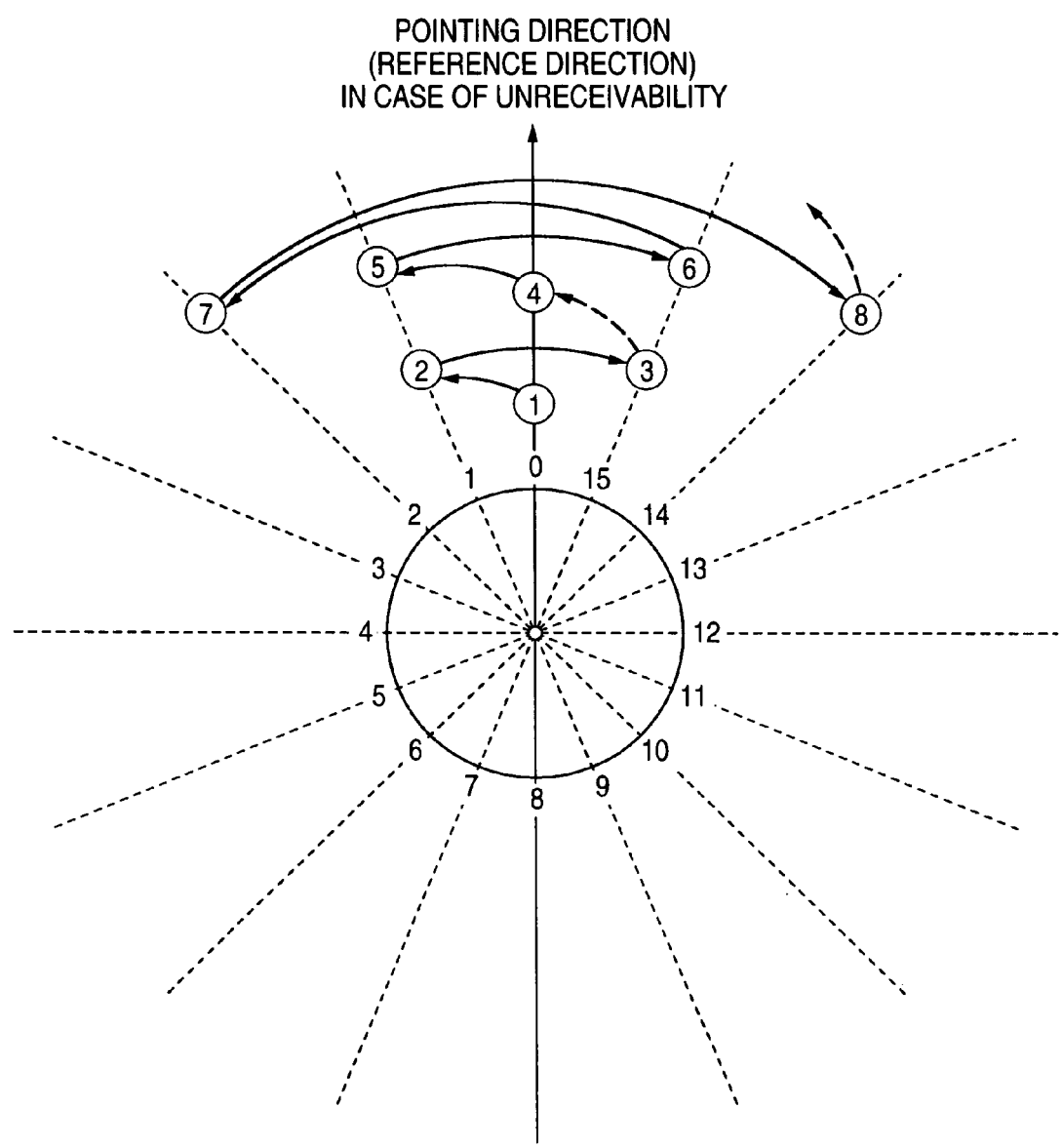
FIG. 6 is a diagram for explaining the operation of a third embodiment.

FIG. 6 is a diagram for explaining an operation in the case of unreceivability in the third embodiment of the invention. It is assumed that the pointing direction of the antenna at the occurrence of the unreceivability be direction-0. The direction-0 is set as a reference direction, the pointing direction is first shifted one direction counterclockwise, and the propriety of reception is decided on the basis of a reception level in direction-1. In a case where the unreceivability has been decided also in the direction-1, the pointing direction is subsequently shifted one direction clockwise from the reference direction (direction-0). Then, a shift operation in a first cycle at the beginning ends. Besides, the level of a reception signal in direction-15 is detected. In a case where the unreceivability has been decided also in the direction-15, a shift direction is restored to the reference direction (direction-0). Then, the operation shifts to a succeeding second cycle. In the second cycle, the pointing direction is shifted one direction counterclockwise from the reference direction again, and the propriety of reception in the direction-1 is decided. In a case where the unreceivability has been decided also in the direction-1, the pointing direction is shifted one direction clockwise from the reference direction (direction-0), and the level of a reception signal in the direction-15 is detected. Thus far, the operation is the same as in the first cycle. In the second cycle, in a case where the unreceivability has been decided also in the direction-15, the pointing direction is further shifted two directions counterclockwise from the reference direction, and the propriety of reception in direction-2 is decided. Besides, in a case where the unreceivability has been decided also in the direction-2, the pointing direction is shifted two directions clockwise from the reference direction (direction-0), and the level of a reception signal in direction-14 is detected.

In each cycle, while the alternate scans are being performed counterclockwise and clockwise in this way, the pointing direction is sequentially shifted, and the propriety of the reception of the airwave in each direction is decided. Besides, in a case where the receivable direction has been found in due course, the scan operation is stopped at the point of time, and the found direction is set as a new pointing direction. Thenceforth, the airwave is received with the pointing direction of the antenna fixed to the found direction.

Also in the third embodiment, as in the first and second embodiments, the shift range of the pointing direction is set at a predetermined region near the reference direction. By way of example, the shift range is set at a range of the direction-0-direction-2 on the left side of the reference direction (direction-0), and at a range of the direction-0-direction-14 on the right side of the reference direction (direction-0). However, this is a mere example, and it is also possible to set, for example, a range of the direction-0-direction-3 on the left side of the reference direction and a range of the direction-0-direction-13 on the right side of the reference direction. Essentially, the shift range may be limited within a certain angular range from the reference direction.

In a case where the receivable direction has not been detected in the angular range, the scan operation is returned to the first stage and is restarted with shifting the pointing direction one direction counterclockwise, with the direction-0 as the reference direction. This operation is iterated until the reception of the airwave becomes possible. The reference direction is the direction in which the airwave could be normally received before the occurrence of the unreceivability, and the airwave can be received again at a high probability in the direction near the reference direction. It is therefore permitted to find the receivable direction in a short time, by shifting the pointing direction with the range limited as stated above.

As seen from FIG. 6, in the third embodiment, the pointing direction is shifted over the plurality of cycles. In each cycle, the counterclockwise shift and the clockwise shift are alternately performed from the reference direction so that, as in the first embodiment, the direction as to which the propriety of reception was decided once in the pertinent cycle may not be included in the shift directions. Besides, when one cycle has ended to shift to the next cycle, the shift magnitude of the pointing direction is increased to enlarge the search range. Therefore, multiple decisions are not rendered as to the identical direction within one cycle. In contrast, multiple decisions are rendered as to the identical direction among the cycles (refer to the direction-1, -0 or -15 in FIG. 6). As a result, a search time period till the detection of the receivable direction becomes shorter than in the second embodiment, and a detection precision for the receivable direction can be enhanced more than in the first embodiment.

Figure 7:
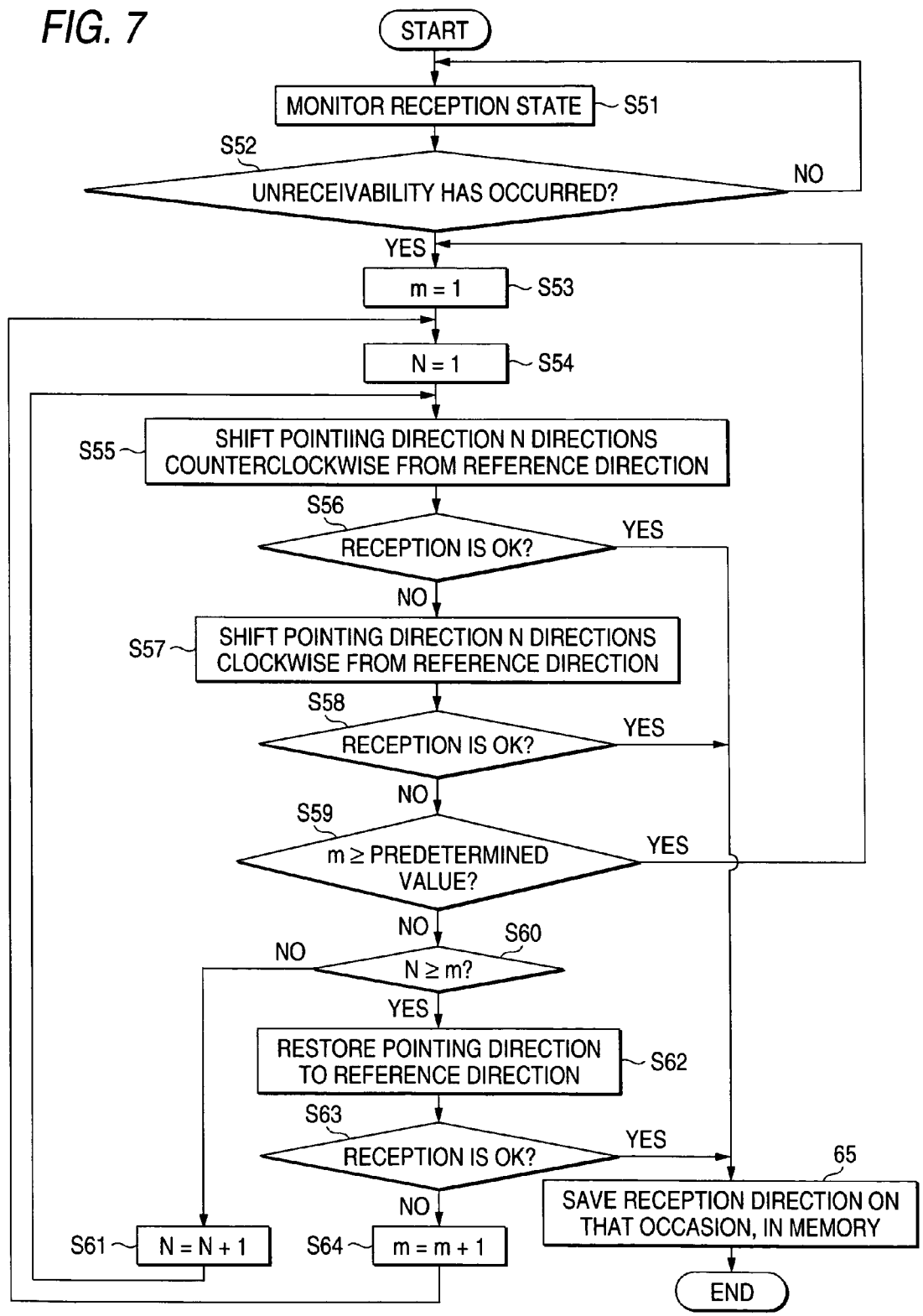
FIG. 7 is a flow chart expressing the operation of the third embodiment.
Figure 8:
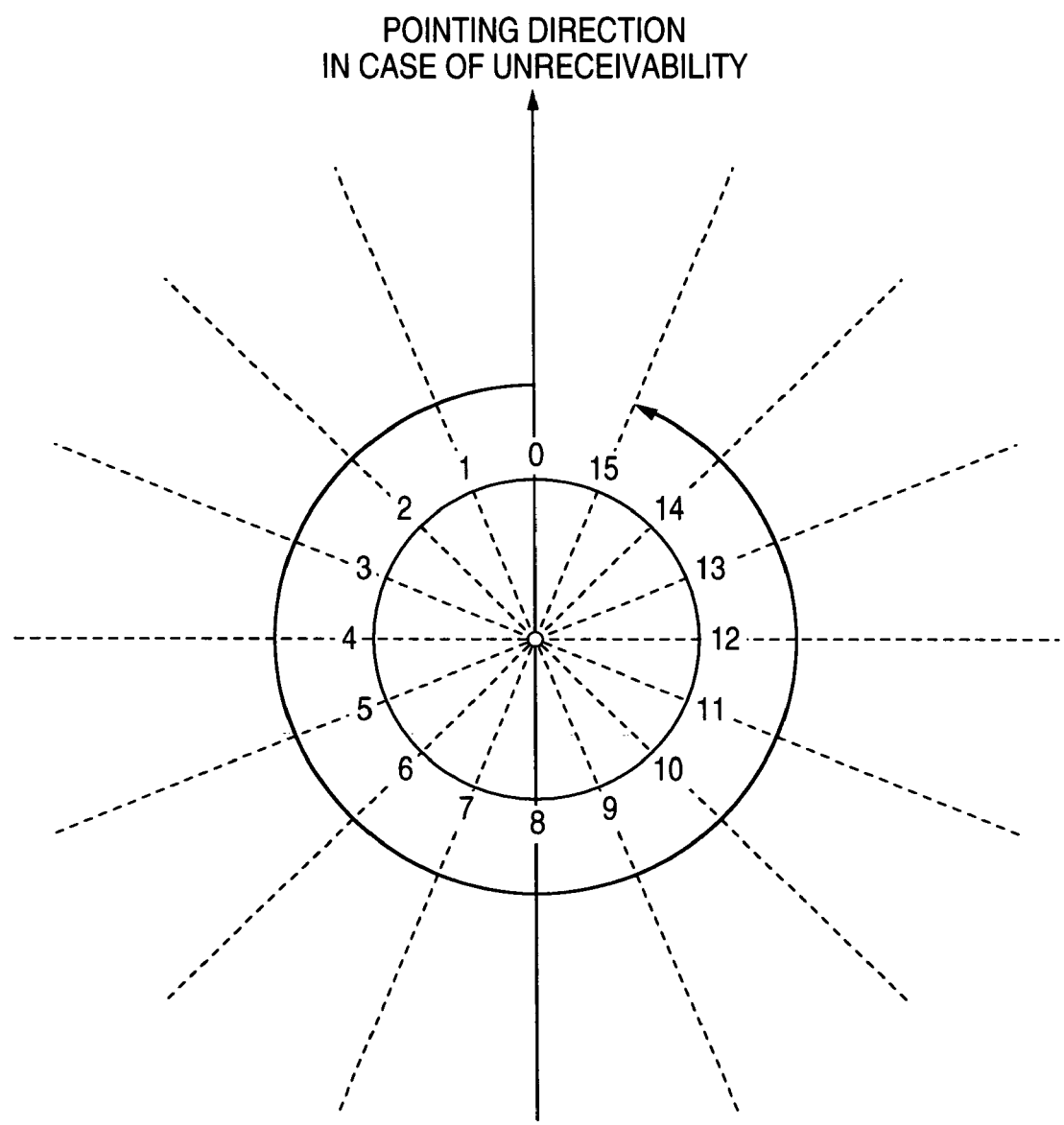
FIG. 8 is a diagram for explaining a search method in the case of unreceivability.

FIG. 7 is a flow chart expressing an operation in the case of unreceivability in the third embodiment described above. The control unit 4 is always monitoring the reception state of the smart antenna 2 (step S51). If the level of a reception signal at the smart antenna 2 is, at least, a threshold value, an unreceivable state has not appeared (step S52: NO), and the control unit 4 returns to the step S51 so as to continue the monitoring of the reception state. When the level of the reception signal at the smart antenna 2 has become less than the threshold value, the control unit 4 decides the appearance of the unreceivable state (step S52: YES) and sets the value of a counter $m$ at m=1 (step S53). The counter $m$ represents the number of cycles of the shift operation, and it is provided in, for example, the predetermined area of the memory (RAM) of the control unit 4 likewise to a counter N. Subsequently, the value of the counter N is set at N=1 (step S54). Thereafter, the pointing direction of the antenna at the occurrence of the unreceivability is set as a reference direction, and this pointing direction is shifted N directions counterclockwise (step S55). Since N=1 holds at the current time, the pointing direction is shifted one direction counterclockwise. The pointing direction on this occasion becomes the direction-1 in FIG. 6.

Subsequently, the control unit 4 detects the level of a reception signal in the pointing direction (direction-1) subjected to the shift, so as to decide the propriety of reception (step S56). In a case where the reception is possible in the pertinent direction (step S56: YES), the reception direction (direction No.) on that occasion is saved in the memory 8 (step S65). On the other hand, in a case where the reception is impossible (step S56: NO), the pointing direction is shifted N directions clockwise from the reference direction (direction-0) (step S57). Since N=1 holds at the current time, the pointing direction is shifted one direction clockwise. The pointing direction on this occasion becomes the direction-15 in FIG. 6.

Subsequently, the control unit 4 detects the level of a reception signal in the pointing direction (direction-15) subjected to the shift, so as to decide the propriety of reception (step S58). In a case where the reception is possible in the pertinent direction (step S58: YES), the reception direction (direction No.) on that occasion is saved in the memory 8 (step S65). On the other hand, in a case where the reception is impossible (step S58: NO), the control unit 4 decides whether or not the value of the counter $m$ has reached a predetermined value (step S59). The predetermined value serves to limit the number of cycles of the shift operation, in other words, the search range of a receivable direction, within a certain range, and it is set at, for example, "3". In the case where the predetermined value is "3", the shift range of the pointing direction becomes a region of the direction-0-direction-3 on the left side of the reference direction and a region of the direction-0-direction-13 on the right side of the reference direction, as understood from later description. Since m=1 (first cycle) holds at the current time, m<3 holds (step S59: NO), and the control unit 4 subsequently decides whether or not the value of the counter N has reached that of the counter m. Since N=1 and m=1 hold at the current time (step S60: YES), the control unit 4 ends the first cycle and shifts to a step S62.

At the step S62, the pointing direction is restored to the reference direction (direction-0). Besides, the control unit 4 decides the propriety of reception in the reference direction (step S63). In a case where the reception is possible (step S63: YES), the reception direction on that occasion is saved in the memory 8 (step S65). On the other hand, in a case where the reception is impossible (step S63: NO), m=m+1 is set by adding "1" to the value of the counter m (step S64). Thus, the value of the counter m becomes "2".

Thereafter, the control unit 4 shifts to the step S54, at which the value of the counter N is set at N=1. Besides, the pointing direction is shifted N directions counterclockwise from the reference direction (step 555). Since N=1 holds at the current time, the pointing direction is shifted one direction counterclockwise. The pointing direction on this occasion becomes the direction-1 in FIG. 6.

Subsequently, the control unit 4 detects the level of a reception signal in the pointing direction (direction-1) subjected to the shift, so as to decide the propriety of reception (step S56). In a case where the reception is possible in the pertinent direction (step S56: YES), the reception direction (direction No.) on that occasion is saved in the memory 8 (step S65). On the other hand, in a case where the reception is impossible (step S56: NO), the pointing direction is shifted N directions clockwise from the reference direction (direction-0) (step S57). Since N=1 holds at the current time, the pointing direction is shifted one direction clockwise. The pointing direction on this occasion becomes the direction-15 in FIG. 6.

Subsequently, the control unit 4 detects the level of a reception signal in the pointing direction (direction-15) subjected to the shift, so as to decide the propriety of reception (step S58). In a case where the reception is possible in the pertinent direction (step S58: YES), the reception direction (direction No.) on that occasion is saved in the memory 8 (step S65). On the other hand, in a case where the reception is impossible (step S58: NO), the control unit 4 decides whether or not the value of the counter m has reached a predetermined value (step S59). Since m=2 (second cycle) holds at the current time, m<3 holds (step S59: NO), and the control unit 4 subsequently decides whether or not the value of the counter N has reached that of the counter m (step S60). Since N=1 and m=2 hold at the current time (step S60: NO), N=N+1 is set by adding "1" to the value of the counter N (step S61). Thus, the value of the counter N becomes "2".

Thereafter, the control unit 4 returns to the step S55, at which the pointing direction is shifted N directions counterclockwise from the reference direction. Since N=2 is holds at the current time, the pointing direction is shifted two directions counterclockwise. The pointing direction on this occasion becomes the direction-2 in FIG. 6. Subsequently, the control unit 4 decides the propriety of reception in the direction-2 (step S56). In a case where the reception is possible in the pertinent direction (step S56: YES), the reception direction on that occasion is saved in the memory 8 (step S65). On the other hand, in a case where the reception is impossible (step S56: NO), the pointing direction is shifted N directions clockwise from the reference direction (direction-0) (step S57). Since N=2 holds at the current time, the pointing direction is shifted two directions clockwise. The pointing direction on this occasion becomes the direction-14 in FIG. 6.

Subsequently, the control unit 4 decides the propriety of reception in the pointing direction (direction-14) subjected to the shift (step S58). In a case where the reception is possible (step S58: YES), the reception direction on that occasion is saved in the memory 8 (step S65). On the other hand, in a case where the reception is impossible (step S58: NO), the control unit 4 decides whether or not the value of the counter m has reached the predetermined value (step S59). Since m=2 (second cycle) holds at the current time, m<3 holds (step S59: NO), and the control unit 4 subsequently decides whether or not the value of the counter N has reached that of the counter m (step S60). Since N=2 and m=2 hold at the current time (step S60: YES), the control unit 4 ends the second cycle and shifts to the step S62.

At the step S62, the pointing direction is restored to the reference direction (direction-0). Besides, the control unit 4 decides the propriety of reception in the reference direction (step S63). In a case where the reception is possible (step S63: YES), the reception direction on that occasion is saved in the memory 8 (step S65). On the other hand, in a case where the reception is impossible (step S63: NO), m=m+1 is set by adding "1" to the value of the counter m (step S64). Thus, the value of the counter m becomes "3".

Thereafter, the control unit 4 shifts to the step S54, at which the value of the counter N is set at N=1. Besides, the pointing direction is shifted N directions counterclockwise from the reference direction (step S55). Since N=1 holds at the current time, the pointing direction is shifted one direction counterclockwise. The pointing direction on this occasion becomes the direction-1 in FIG. 6. Thenceforth, the steps S55-S61 are similarly iterated, thereby to execute the alternate counterclockwise and clockwise shift operations in the third cycle. Besides, when the pointing direction has been shifted to the direction-13 by the clockwise shift, m≧3 holds at the step S59. Accordingly, the control unit 4 ends the third cycle and returns to the step S53, at which the first cycle is restored (m=1) so as to iterate the series of processing steps described above.

When the receivability has been decided at the step S56, S58 or S63, and the reception direction has been saved in the memory 8 at the step S65, the pointing direction stored in the memory 8 is updated, and the smart antenna 2 sets the directionality at the pertinent new direction on the basis of a command from the control unit 4, so as to receive the airwave henceforth.

In each of the foregoing embodiments, there has been mentioned the example in which the present invention is applied to the broadcast receiver 1 that has the smart antenna 2 connected thereto. The invention, however, is also applicable to, for example, a broadcast receiver to which an antenna different from the smart antenna, capable of switching its directionality in a plurality of directions like an adaptive array antenna is connected. Besides, the invention is applicable to, for example, a broadcast receiver which receives radio broadcasts, or a broadcast receiver which receives satellite broadcasts.

What is claimed is:

1. A broadcast receiver comprising:
   a smart antenna configured to be disposed on an immobile object;
   a tuner, configured to extract a signal of predetermined channel from among airwaves received by the smart antenna;

a signal processing unit, configured to process the signal extracted by the tuner; and a control unit, configured to:

set a direction that the smart antenna is directed when the smart antenna fails to receive the airwaves as a reference direction; and rotate the smart antenna within a predetermined angle less than 90 degree from the reference direction until the smart antenna receives the airwaves in the following order;

i) rotate in a first direction by a first angle from the reference direction;

ii) rotate in a second direction which is opposite to the first direction by the first angle;

iii) repeat ii) by the first angle from the reference direction;

iv) rotate in the first direction in the first angle;

v) repeat iv) by a second angle which is larger than the first angle from the reference position;

vi) rotate in the second direction by the first angle;

vii) repeat vi) by the second angle from the reference position; and viii) repeat vi) to vii) while increasing the second angle, wherein the second angle is no greater than 90 degrees.

2. A broadcast receiver comprising:

a smart antenna configured to be disposed on an immobile object;

a tuner, configured to extract a signal of predetermined channel among airwaves received by the smart antenna;

a signal processing unit, configured to process the signal extracted by the tuner; and a control unit, configured to:

set a direction that the smart antenna is directed when the smart antenna fails to receive the airwaves as a reference direction; and rotate the smart antenna within a predetermined angle less than 90 degree from the reference direction until the smart antenna receives the airwaves in the following order;

i) rotate in a first direction by a first angle from the reference direction;

ii) rotate in a second direction which is opposite to the first direction by a second angle which is double of the first angle;

iii) rotate to the reference direction and increment a first number of times indicating that the smart antenna has to be reciprocately rotated by one;

iv) if a second number of times indicating that the smart antenna is actually reciprocately rotated is lower than the first number of times, repeat i) and ii) while increasing the first angle;

v) if the second number of times is equal to the first number of times, reset the second number of times and return to iii); and vi) repeat iii) to v), wherein the first angle is no greater than 90 degrees.

* * * * *